(12) United States Patent
Wuidart et al.

(10) Patent No.: US 7,941,672 B2
(45) Date of Patent: May 10, 2011

(54) REGENERATION OF A SECRET QUANTITY FROM AN INTERGRATED CIRCUIT IDENTIFIER

(75) Inventors: Luc Wuidart, Pourrieres (FR); Michel Bardouillet, Rousset (FR); Laurent Plaza, Fuveau (FR)

(73) Assignee: STMicroelectronics S.A., Montrouge (FR)

( * ) Notice: Subject to any disclaimer, the term of this patent is extended or adjusted under 35 U.S.C. 154(b) by 961 days.

(21) Appl. No.: 10/268,459

(22) Filed: Oct. 10, 2002

(65) Prior Publication Data

US 2003/0102493 A1 Jun. 5, 2003

(30) Foreign Application Priority Data

Nov. 30, 2001 (FR) .................................... 01 15526

(51) Int. Cl.
*G06F 11/30* (2006.01)
*G06F 12/14* (2006.01)

(52) U.S. Cl. ........................................ 713/189; 380/277
(58) Field of Classification Search .................. 713/184, 713/189; 380/265, 45, 277; 726/9, 20, 2
See application file for complete search history.

(56) References Cited

U.S. PATENT DOCUMENTS

| | | | | |
|---|---|---|---|---|
| 4,529,870 A * | 7/1985 | Chaum | .......................... | 235/380 |
| 4,663,500 A * | 5/1987 | Okamoto et al. | ................ | 380/47 |
| 4,783,801 A * | 11/1988 | Kaule | ........................... | 713/194 |
| 4,862,501 A * | 8/1989 | Kamitake et al. | .............. | 713/172 |
| 5,036,461 A * | 7/1991 | Elliott et al. | ..................... | 705/44 |
| 5,227,613 A * | 7/1993 | Takagi et al. | .................. | 235/380 |
| 5,363,448 A * | 11/1994 | Koopman et al. | .............. | 713/170 |
| 5,436,971 A * | 7/1995 | Armbrust et al. | ............... | 705/67 |
| 5,495,419 A | 2/1996 | Rostoker et al. | | |
| 5,680,458 A * | 10/1997 | Spelman et al. | .............. | 380/277 |
| 5,734,819 A | 3/1998 | Lewis | | |
| 5,818,738 A * | 10/1998 | Effing | ........................... | 702/117 |
| 5,841,866 A * | 11/1998 | Bruwer et al. | ................... | 705/66 |
| 5,903,461 A | 5/1999 | Rostoker et al. | | |
| 5,999,629 A * | 12/1999 | Heer et al. | ....................... | 705/51 |
| 6,073,236 A * | 6/2000 | Kusakabe et al. | .............. | 713/169 |
| 6,097,814 A * | 8/2000 | Mochizuki | ....................... | 380/44 |
| 6,161,213 A * | 12/2000 | Lofstrom | .......................... | 716/4 |
| 6,209,098 B1 * | 3/2001 | Davis | ............................. | 713/194 |
| 6,230,267 B1 * | 5/2001 | Richards et al. | ............... | 713/172 |
| 6,230,270 B1 * | 5/2001 | Laczko, Sr. | ...................... | 726/34 |
| 6,253,223 B1 * | 6/2001 | Sprunk | .......................... | 708/250 |
| 6,308,256 B1 * | 10/2001 | Folmsbee | ....................... | 712/209 |

(Continued)

FOREIGN PATENT DOCUMENTS

DE 19843424 A1 3/2000

(Continued)

OTHER PUBLICATIONS

French Search Report from priority French patent application No. 0115526, filed Nov. 30, 2002.

(Continued)

*Primary Examiner* — Christopher J Brown
(74) *Attorney, Agent, or Firm* — Lisa K. Jorgenson; William R. McClellan; Wolf, Greenfield & Sacks, P.C.

(57) ABSTRACT

A method and a circuit for generating a secret quantity based on an identifier of an integrated circuit, including combining a first digital word derived from a physical parameter network with a second word stored in a non-volatile memory element.

18 Claims, 1 Drawing Sheet

U.S. PATENT DOCUMENTS

| | | | |
|---|---|---|---|
| 6,317,829 B1 * | 11/2001 | Van Oorschot | 713/155 |
| 6,408,388 B1 * | 6/2002 | Fischer | 713/176 |
| 6,438,718 B1 | 8/2002 | Cline | |
| 6,641,050 B2 * | 11/2003 | Kelley et al. | 235/492 |
| 6,650,753 B1 * | 11/2003 | Lotspiech et al. | 380/277 |
| 6,651,170 B1 * | 11/2003 | Rix | 713/193 |
| 6,704,872 B1 * | 3/2004 | Okada | 713/194 |
| 6,715,078 B1 * | 3/2004 | Chasko et al. | 713/193 |
| 6,795,837 B1 * | 9/2004 | Wells | 708/3 |
| 6,845,450 B1 * | 1/2005 | Kobayashi et al. | 726/5 |
| 7,016,924 B2 * | 3/2006 | Nakabe et al. | 708/250 |
| 2001/0041593 A1 * | 11/2001 | Asada | 455/558 |
| 2001/0055132 A1 * | 12/2001 | Oshima et al. | 359/109 |
| 2003/0103628 A1 | 6/2003 | Luc et al. | |
| 2003/0103629 A1 | 6/2003 | Wuidart et al. | |
| 2004/0199736 A1 | 10/2004 | Kamano et al. | |
| 2005/0021990 A1 | 1/2005 | Liardet et al. | |
| 2005/0188218 A1 | 8/2005 | Walmsley et al. | |

FOREIGN PATENT DOCUMENTS

EP     998073 A2 *   5/2000

OTHER PUBLICATIONS

French Search Report from related French patent application No. 0115529, filed Nov. 30, 2001.

Menezes et al, *Handbook of Applied Cryptography*, Handbook of Applied Cryptography, CRC Press Series on Discrete Mathematics and Its Applications, 1997 pp. 39-41, 203-208, 568 XP002217340.

Schneier, B., *Applied Cryptography*, Applied Cryptography. Protocols Algorithms, and Source Code in C, 1996, pp. 381-384 XP002217341.

Search Report from French Patent Application No. 0115531, filed Nov. 30, 2001.

* cited by examiner

REGENERATION OF A SECRET QUANTITY FROM AN INTERGRATED CIRCUIT IDENTIFIER

BACKGROUND OF THE INVENTION

1. Field of the Invention

The present invention relates to the use of a secret quantity coming from an integrated circuit or from an electronic unit containing such a circuit. For example, the present invention relates to the use of such a secret quantity by programs such as an encryption key, as a secret quantity of an integrated circuit identification or authentication process. The present invention more specifically relates to the use of a digital identifier of an integrated circuit chip derived from a physical parameter network linked to the manufacturing of the integrated circuit chip.

2. Discussion of the Related Art

The use of an identifier derived from a physical parameter network, for example, to authenticate an integrated circuit chip or to code a datum that it provides, is more and more appreciated since this enables using a binary word hidden or embedded in the integrated circuit without permanently storing it in a storage element that could be pirated. The system reliability against possible frauds is thus improved. Further, the use of a physical parameter network enables obtaining digital identifiers distinct from one another for different integrated circuit chips originating from a given manufacturing.

Generally, the digital identifier of the integrated circuit is provided to the outside of the circuit after having possibly been coded or scrambled to be transmitted to a remote system. The latter exploits the word that it receives, generally without having to know the identifier.

An example of application of the present invention relates to the field of smart cards used for financial transactions from count units, prepaid or not, be the transmission with or without contact with the smart card reader.

Another example of application relates to data transmission systems using a personalized decoder on the user side. In such a case, the decoder may include an authentication circuit exploiting an identifier derived from a physical parameter network of an integrated circuit that it contains. By analogy with smart card readers used in payment systems, this amounts to combining a reader with its smart card at the user level, the authentication remaining made by a system different from the reader.

A disadvantage of the use of an integrated circuit identifier derived from a physical parameter network is linked to its individual and immovable character.

Thus, in the case where a pirate succeeds in pirating the identifier or a digital word (authentication amount or coding key) containing this identifier, there is no other solution than changing the integrated circuit. Indeed, from the moment that the identifier is suspected to have been pirated, it is desirable, in secure applications, to no longer use this identifier. This phenomenon is generally known as the revocation of a coding key or of an authenticator, or more generally of a secret quantity.

The absence of any solution to the revocation of a key or of a secret quantity based on the use of a physical parameter network of an integrated circuit presently limits the use of these identifiers which are, for many other purposes, very advantageous.

SUMMARY OF THE INVENTION

The present invention aims at overcoming the known disadvantages of a digital identifier derived from a physical parameter network in an integrated circuit.

The present invention more specifically aims at enabling revocation of a secret quantity or key based on an identifier derived from a physical parameter network without having to change the involved integrated circuit.

It could be devised to multiply the number of physical parameter networks to multiply the number of possible digital identifiers in case of a revocation. Such a solution, however, has the disadvantage of being bulky in the integrated circuit. Further, the number of possible identifiers remains very limited.

Further, a secret quantity size which is greater than the size of the word coming from the physical parameter network may be searched.

Another object of the present invention is to provide a solution which does not eliminate the individual character of the integrated circuit identifier by means of a physical parameter network.

The present invention also aims at providing a solution which is compatible with the miniaturization of integrated circuits.

The present invention also aims at providing a solution which is transparent on the secret quantity exploitation system side, that is, which does not require for the latter to known the means used, to make the secret quantity more secure.

To achieve these and other objects, the present invention provides a method for generating a secret quantity based on an identifier of an integrated circuit, comprising combining a first digital word derived from a physical parameter network with a second word stored in a non-volatile memory element.

According to an embodiment of the present invention, the second word is intended to be modified after a revocation of a preceding secret quantity.

According to an embodiment of the present invention, the second word is randomly generated.

According to an embodiment of the present invention, at least the first word and the secret quantity are stored in elements of a secure area of the integrated circuit.

According to an embodiment of the present invention, the second word is scrambled by means of at least a portion of the first word.

The present invention also provides a method for modifying a secret quantity of identification of an integrated circuit, obtained from a first digital word derived from a physical parameter network and considered as being revoked, comprising combining said first word with a second word stored in a non-volatile memory element, and of changing said second word each time a new secret quantity needs being generated.

The present invention further provides a circuit for generating a secret quantity internal to an integrated circuit, including:

a generator of a first word specific to the integrated circuit chip based on a physical parameter network;

a non-volatile storage element intended to contain a second digital word; and a combiner of the first two words providing said secret quantity.

According to an embodiment of the present invention, the second word can be replaced in case of the revocation of a secret quantity.

According to an embodiment of the present invention, the circuit further includes a scrambler at the input/output of the non-volatile storage element, the scrambler exploiting at least a portion of the first word coming from the physical parameter network.

According to an embodiment of the present invention, the circuit further includes a generator of random words to form said second digital word.

According to an embodiment of the present invention, the circuit includes means for making ephemeral (temporarily storing) the respective storages of the first digital word coming from the physical parameter network and of the word forming the secret quantity.

The foregoing objects, features and advantages of the present invention, will be discussed in detail in the following non-limiting description of specific embodiments in connection with the accompanying drawings.

DETAILED DESCRIPTION

Figure 1:
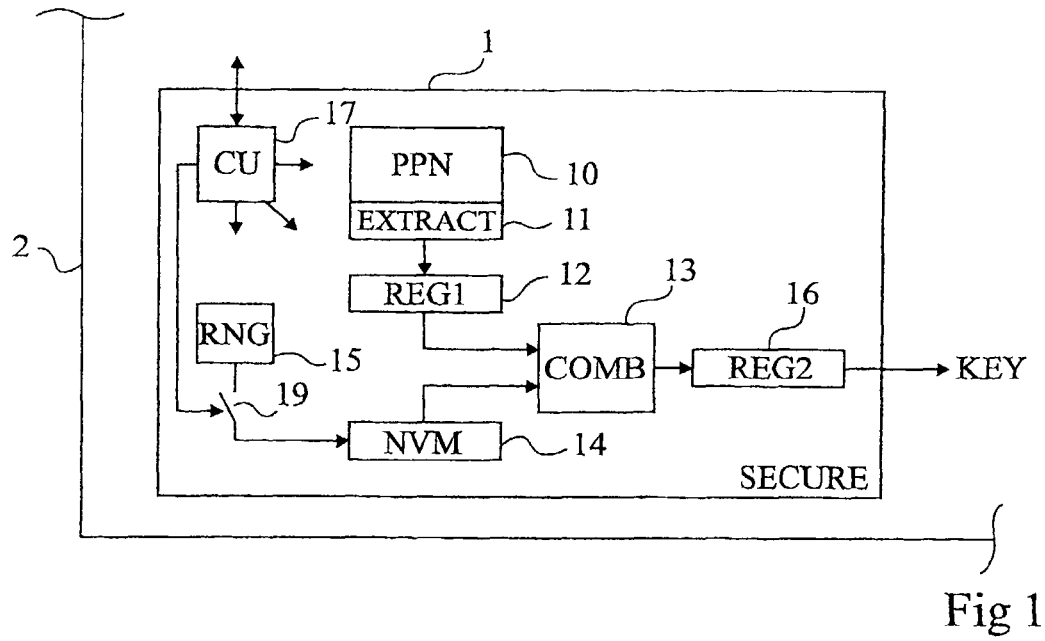
FIG. 1 shows, in a very simplified view and in the form of blocks, an embodiment of a cell for extracting a secret quantity according to the present invention.

For clarity, only those elements of the integrated circuit that are necessary to the understanding of the present invention have been shown in the drawings and will be described hereafter. In particular, the components of the integrated circuit or of the electronic sub-assembly element which do not take part in the generation of the secret quantity by means of the physical parameter network characteristic of the present invention have not been illustrated. Further, the exploitation of the secret quantity (for example, by an authentication or coding process), be it internal or external to the integrated circuit, has not been detailed, since the present invention applies to any conventional process.

A feature of the present invention is to combine, within the very cell of generation of the secret quantity of an integrated circuit, a first digital word coming from a physical parameter network with a second digital word stored in a non-volatile storage element of the generation cell. The actual secret quantity, used for example to code a digital datum or to authenticate the integrated circuit or more generally the electronic element or sub-assembly containing it, is formed of the word resulting from this combination.

FIG. 1 very schematically shows in the form of blocks a first embodiment of a cell 1 for generating a secret quantity KEY of an integrated circuit 2. Integrated circuit 2 includes other elements, not shown. Only cell 1 for generating secret quantity KEY is of interest for the present invention. This quantity may then be exploited to authenticate the integrated circuit by an external system or to code other data, possibly after other processings undergone within circuit 2.

Cell 1 essentially includes a physical parameter network 10 (PPN) linked to the integrated circuit chip manufacturing. Network 10 provides a great number of signals and is associated with an circuit 11 (EXTRACT) for extracting a first digital word stored in a temporary storage element 12 (REG1).

The physical parameter network may be formed by any conventional network comprising, for example, of measuring electric parameters. It may, for example, be a measurement of a threshold voltage of a transistor, a measurement of a resistance or a measurement of a stray capacitance, a measurement of the current generated by a current source, a measurement of a time constant (for example, an RC circuit), a measurement of an oscillation frequency, etc. Since these characteristics are sensitive to technological and manufacturing process dispersions of the integrated circuit, it is considered that the electric parameters taken into account are specific to the manufacturing and form a signature of the integrated circuit.

The exploitation of the electric parameters to obtain the first digital word is conventional. For example, the electric signals are converted into digital signals by means of an analog-to-digital converter and may be multiplexed to form the word stored in register 12.

As a physical parameter network, circuits using a time measurement may possibly be used. For example, the read/write time of an EEPROM-type memory is measured. An example of a physical parameter network of this type is described in U.S. Pat. No. 5,818,738, which is incorporated herein by reference.

Physical parameter network 10 may further be formed of a latch network such as described in French patent application no. 0,104,585 of the applicant, which is incorporated herein by reference.

According to the present invention, the digital word stored in register 12 is provided to a combiner 13 (COMB) also receiving a second digital word stored in a non-volatile memorization element 14 (NVM). Digital word 14 is generated, preferably, by means of a random generator 15 (RNG) when necessary, that is, each time the secret quantity needs changing due to a revocation.

Combiner 13 provides the secret quantity which is stored, preferably temporarily, in a storage element 16 (REG2). The extraction cell is controlled by a central unit 17 (CU) further communicating with the rest of integrated circuit 2. The function of unit 17 is, among others, to cause the generation of the secret quantity when required, for example, by the implementation of an authentication process of the integrated circuit, and to synchronize the operation of the different components of cell 1. Unit 17 is also used to cause the generation of a new digital word stored in element 14 in case of a revocation of the previously-used secret quantity. This function has been illustrated, schematically and as an example, by a switch 19, interposed on the link connecting generator 15 to storage element 14, and controlled by unit 17.

Preferably, the entire cell 1 is in a so-called secure area (SECURE) of the integrated circuit. Such a secure area means that it is protected against a fraud attempt by direct electric measurement on the integrated circuit. Any known method for securing integrated circuit areas may be used. For example, it may be a cell buried in a resin, the melting temperature of which would destroy the circuit if a pirate attempted to detect its content.

As an alternative, instead of a random generation by element 15, several digital words are contained in a table stored in a non-volatile memory (not shown). The cell then selects one of these words (with no possibility of reusing a word which has already been used) each time a regeneration is needed after a revocation. In this case, it will be ascertained that the memory containing the table is in a secure area.

The different connections of central control unit 17 to the other components of the generation cell have not been shown and are within the abilities of those skilled in the art based on the functional indications of the present description.

An advantage of the present invention is that by combining the datum coming from the physical parameter network with another secret datum stored in the integrated circuit, the quantity provided by extraction cell 1 may be revoked without is being necessary to change the integrated circuit to replace it. Indeed, the regeneration of a digital word to be stored in element 14 is triggered, for example, by means of random generator 15. This word is then used by combiner 13 to generate a different quantity or key KEY.

It should be noted that generated quantity KEY forms the very signature of the integrated circuit in the sense of the present invention, that is, the system exploiting the secret quantity, for example, in the case of an authentication, needs not know that it is a combination.

Another advantage of the present invention is that by combining a datum coming from the physical parameter network and thus, by definition, not permanently stored in a storage element, with a digital word stored in a non-volatile memory, the advantages linked to the use of a datum coming from a physical parameter network are kept, in particular, the absence of a detectability by direct electric measurement.

Another advantage of combining the quantity coming from the physical parameter network with another quantity is that this guarantees different quantities KEY even if two circuits generate identical first words (register 12). This corresponds to the case where the physical parameter networks of two distinct circuits would have the same response by chance.

According to a preferred embodiment of the present invention, the datum stored in register 12 is ephemeral (i.e., stored temporarily), that is, central unit 17 controls the extraction of the digital word coming from the physical parameter network each time the secret quantity needs being used, and controls the deleting of the words contained in registers 12 and 16 after a predetermined duration which follows this generation. This duration is calculated to leave time to the conventional secret datum exploitation process to perform the necessary processings (for example, leave time to the authentication process of the integrated circuit to perform the necessary checkings or to the coding process to execute the provided algorithms).

The combination function performed by element 13 may be any known combination function. A simple function of bit-to-bit or result addition, multiplication, subtraction type, or more complex functions, may be chosen. It should however be noted that the fact of having made the secret quantity provided by the integrated circuit revocable makes the combiner complexity less critical. This however does not exclude implementing more complex algorithms according to applications. For example, a so-called one-way chopping function receiving as an input the word coming from the physical parameter network and, as a parameterizing word, the word stored in the non-volatile memory, may be implemented.

Figure 2:
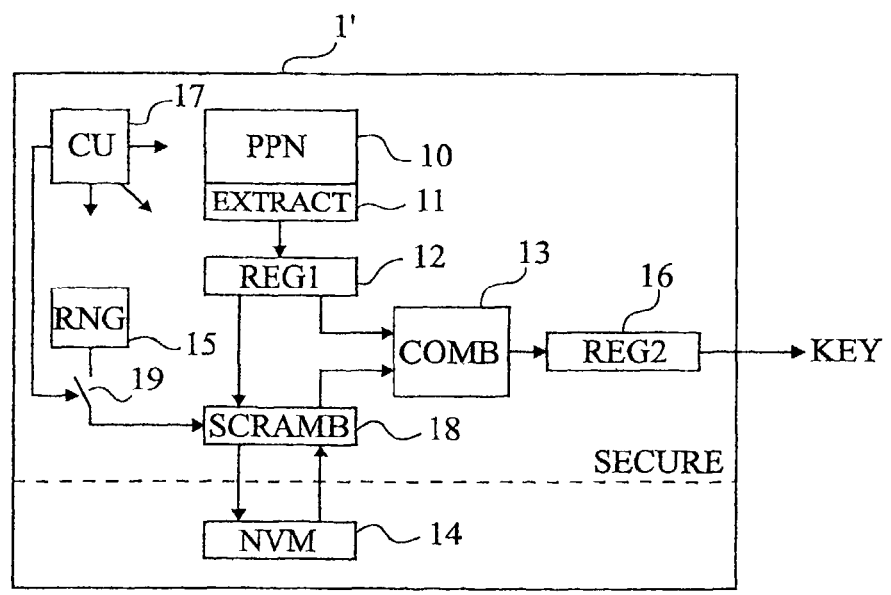
FIG. 2 illustrates an alternative of the extraction cell of FIG. 1.

FIG. 2 shows a cell 1' for generating a secret quantity of an integrated circuit according to a second embodiment of the present invention. Cell 1' includes all the components of cell 1 described in relation with FIG. 1. However, according to this second embodiment, it is further provided to scramble the second digital word coming from non-volatile storage element 14 by means of the digital word coming from the physical parameter network, entirely or partly, with the help of a scrambling element 18 (SCRAMB).

To record a digital word in element 14, random generator 15 or the predetermined word table provides a word to scrambler 18, and central unit 17 triggers the extraction of the digital word coming from the physical parameter network which is provided by register 12 to scrambler 18. Such a scrambling may correspond to any conventional coding or combination of two digital words (coming from register 12 and, for example, from generator 15) to obtain the word to be stored in element 14.

Upon generation of quantity KEY by cell 1', element 18 operates as a decoder and uses here again all or part of the digital word stored in register 12 to decode the word extracted from element 14 and provide the result to combiner 13. The rest of the operation of cell 1' corresponds to the operation discussed in relation with FIG. 1.

The use of a coder integrated to the secure area (SECURE) of cell 1 enables storing the word contained in register 14 in a non-volatile memory external to this area illustrated by dotted lines in FIG. 2.

An advantage of the present invention is that it is independent from the exploitation of quantity KEY by the outside of the cell. Thus, the implementation of the present invention is compatible with existing procedures of exploitation of a secret quantity provided by an integrated circuit.

Another advantage of the present invention is that it keeps the volatility (ephemeral character) of the secret quantities based on the extraction of a word coming from a physical parameter network.

Of course, the present invention is likely to have various alterations, modifications, and improvement which will readily occur to those skilled in the art. In particular, the choice of the sizes of the digital words used depends on the application and on the length of the secret quantity which is desired to be obtained. This choice is performed conventionally, especially according to the complexity desired for the extraction cell and to the number of possible secret quantities desired for the used authentication processor.

Further, to store the digital words, any adapted storage element may be used, for example, memories or portions of memories, volatile or not according to the type of stored data. Further, the writing and the reading of the data in these storage elements may be performed in series or in parallel.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for generating a secret quantity based on an identifier of an individual integrated circuit, comprising combining a first digital word derived from a physical parameter network with a second word to form the secret quantity, the secret quantity being a word resulting from the combining, the second word being generated internal to the integrated circuit and stored in a non-volatile memory element of the integrated circuit, the physical parameter network measuring a fixed, single value of an electrical parameter of the integrated circuit, the measured value of the electrical parameter being sensitive to technological and manufacturing process variations of the integrated circuit, the measured value forming an identifier of the individual integrated circuit and being converted to the first digital word, revoking the secret quantity, generating a new second word, and combining the first digital word with the new second word to form a new secret quantity, the new secret quantity being a new word resulting from the combining, the new secret quantity being based on the new second word and on the fixed, single value of the electrical parameter of the integrated circuit, without replacing the integrated circuit to provide the new secret quantity, the new secret quantity being generated, after revoking the secret quantity, under control of a controller located within a secure area of the integrated circuit.

2. The method of claim 1, wherein the second word is randomly generated.

3. The method of claim 1, wherein at least the first word and the secret quantity are stored in elements of the secure area of the integrated circuit.

4. The method of claim 1, wherein the second word is scrambled by means of at least a portion of the first word.

5. A method for modifying a secret quantity of identification of an individual integrated circuit, obtained from a first digital word derived from a physical parameter network and considered as being revoked, comprising combining said first word with a second word to form the secret quantity, the secret quantity being a word resulting from the combining, the second word being generated internal to the integrated circuit and stored in a non-volatile memory element of the integrated circuit, the physical parameter network measuring a fixed, single value of an electrical parameter of the integrated circuit, the measured value of the electrical parameter being sensitive, to technological and manufacturing process variations of the integrated circuit, the measured value forming an identifier of the individual integrated circuit and being converted to the first digital word, revoking the secret quantity, generating a new second word, and combining the first digital word with the new second word to form a new secret quantity, the new secret quantity being a new word resulting from the combining, the new secret quantity being based on the new second word and on the fixed, single value of the electrical parameter of the integrated circuit, without replacing the integrated circuit to provide the new secret quantity, the new secret quantity being generated, after revoking the secret quantity, under control of a controller located within a secure area of the integrated circuit.

6. A circuit for generating a secret quantity internal to an individual integrated circuit, including:
   a generator of a first digital word specific to the integrated circuit based on a physical parameter network, the physical parameter network measuring a fixed, single value of an electrical parameter of the integrated circuit, the measured value of the electrical parameter being sensitive to technological and manufacturing process variations of the integrated circuit, the measured value forming an identifier of the individual integrated circuit and being converted to the first digital word;
   a generator of a second digital word internal to the integrated circuit;
   a non-volatile storage element of the integrated circuit to contain the second digital word;
   a combiner of the first and second digital words providing said secret quantity, said secret quantity being a word output by said combiner; and
   a controller to control the generator of the second digital word and the combiner for revoking the secret quantity, generating a new second digital word, and combining the first digital word with the new second digital word to form a new secret quantity, the new secret quantity being a new word output by the combiner, the new secret quantity being based on the new second digital word and on the fixed, single value of the electrical parameter of the integrated circuit, without replacing the integrated circuit to provide the new secret quantity, at least the generator of the first digital word, the generator of the second digital word, the combiner and the controller being located within a secure area of the integrated circuit.

7. The circuit of claim 6, further including a scrambler at the input/output of the non-volatile storage element, the scrambler exploiting at least a portion of the first word coming from the physical parameter network.

8. The circuit of claim 6, wherein the generator of the second digital word comprises a random generator.

9. The circuit of claim 6, including means for making ephemeral the respective storages of the first digital word coming from the physical parameter network and of the word forming the secret quantity.

10. A method for generating a secret quantity in an individual integrated circuit, comprising:
   generating a first word based on a physical parameter network, the physical parameter network measuring a fixed, single value of an electrical parameter of the integrated circuit, the measured value of the electrical parameter being sensitive to technological and manufacturing process variations of the integrated circuit, the measured value forming an identifier of the individual integrated circuit and being converted to the first word;
   randomly generating a second word internal to the integrated circuit and storing the randomly-generated second word in a non-volatile storage element of the integrated circuit;
   accessing the second word stored in the non-volatile storage element of the integrated circuit; and
   combining the first and second words to form the secret quantity unique to the integrated circuit and based on the physical parameter network, the secret quantity being a word resulting from the combining, revoking the secret quantity, generating a new second word, and combining the first word with the new second word to form a new secret quantity, the new secret quantity being a new word resulting from the combining, the new secret quantity being based on the new second word and on the fixed, single value of the electrical parameter of the integrated circuit, without replacing the integrated circuit to provide the new secret quantity, the new secret quantity being generated, after revoking the secret quantity, under control of a controller located within a secure area of the integrated circuit.

11. A method as defined in claim 10, further comprising storing the first word and the secret quantity in the secure area of the integrated circuit.

12. A method as defined in claim 10, further comprising scrambling the second word by at least a portion of the first word.

13. A method as defined in claim 12, wherein the non-volatile storage element is located outside the secure area of the integrated circuit.

14. A circuit for generating a secret quantity in an individual integrated circuit, comprising:
   a generator configured to generate a first word based on a physical parameter network, the physical parameter network measuring a fixed, single value of an electrical parameter of the integrated circuit, the measured value of the electrical parameter being sensitive to technological and manufacturing process variations of the integrated circuit, the measured value forming an identifier of the individual integrated circuit and being converted to the first word;
   a random generator internal to the integrated circuit and configured to generate a second word;
   a non-volatile storage element of the integrated circuit containing the second word;
   a combiner configured to combine the first and second words to provide the secret quantity unique to the integrated circuit and based on the physical parameter network, the secret quantity being a word output by the combiner; and
   a controller to control the random generator and the combiner for revoking the secret quantity, generating a new second word, and combining the first word with the new second word to form a new secret quantity, the new secret quantity being a new word output by the combiner, the new secret quantity being based on the new second word and on the fixed, single value of the electrical parameter of the integrated circuit, without replacing the integrated circuit to provide the new secret quantity, at least the generator, the random generator, the combiner and the controller being located within a secure area of the integrated circuit.

15. A circuit as defined in claim 14, further comprising a scrambler configured to scramble the second word by at least a portion of the first word.

16. A circuit as defined in claim 15, wherein the non-volatile storage element is located outside the secure area of the integrated circuit.

17. A method for modifying a secret quantity in an individual integrated circuit, comprising:
generating a first word based on a physical parameter network, the physical parameter network measuring a fixed, single value of an electrical parameter of the integrated circuit, the measured value of the electrical parameter being sensitive to technological and manufacturing process variations of the integrated circuit, the measured value forming an identifier of the individual integrated circuit and being converted to the first word;
generating a second word with a random generator internal to the integrated circuit and storing the randomly-generated second word in a non-volatile storage element of the integrated circuit;
accessing the second word stored in the non-volatile storage element of the integrated circuit;
combining the first and second words to form the secret quantity unique to the integrated circuit and based on the physical parameter network, the secret quantity being a word resulting from the combining; and
revoking the secret quantity, generating a new second word, and combining the first word with the new second word to form a new secret quantity, the new secret quantity being a new word resulting from the combining, the new secret quantity being based on the new second word and on the fixed, single value of the electrical parameter of the integrated circuit, without replacing the integrated circuit to provide the new secret quantity, wherein revoking the secret quantity, generating a new second word, and combining the first word with the new second word to form a new secret quantity are performed under control of a controller located within a secure area of the integrated circuit.

18. A method as defined in claim 17, further comprising scrambling the second word by at least a portion of the first word.

\* \* \* \* \*

UNITED STATES PATENT AND TRADEMARK OFFICE
CERTIFICATE OF CORRECTION

| | |
|---|---|
| PATENT NO. | : 7,941,672 B2 |
| APPLICATION NO. | : 10/268459 |
| DATED | : May 10, 2011 |
| INVENTOR(S) | : Luc Wuidart et al. |

It is certified that error appears in the above-identified patent and that said Letters Patent is hereby corrected as shown below:

On the Title Page, item (54) should read:
REGENERATION OF A SECRET QUANTITY FROM AN INTEGRATED CIRCUIT IDENTIFIER Signed and Sealed this
Twenty-first Day of June, 2011

David J. Kappos
*Director of the United States Patent and Trademark Office*

UNITED STATES PATENT AND TRADEMARK OFFICE
CERTIFICATE OF CORRECTION

PATENT NO. : 7,941,672 B2
APPLICATION NO. : 10/268459
DATED : May 10, 2011
INVENTOR(S) : Luc Wuidart et al.

It is certified that error appears in the above-identified patent and that said Letters Patent is hereby corrected as shown below:

On the Title Page, item (54) and at column 1, lines 1-3, title should read:
REGENERATION OF A SECRET QUANTITY FROM AN INTEGRATED CIRCUIT IDENTIFIER This certificate supersedes the Certificate of Correction issued June 21, 2011.

Signed and Sealed this
Twenty-sixth Day of July, 2011

David J. Kappos
*Director of the United States Patent and Trademark Office*